(12) United States Patent
Sornin

(10) Patent No.: US 12,397,339 B2
(45) Date of Patent: Aug. 26, 2025

(54) METHOD FOR MANUFACTURING A DOUBLE-WALL HEAT-EXCHANGER TUBE

(71) Applicant: COMMISSARIAT A L'ENERGIE ATOMIQUE ET AUX ENERGIES ALTERNATIVES, Paris (FR)

(72) Inventor: Denis Sornin, Saint Pierre du Perray (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/679,687

(22) Filed: May 31, 2024

(65) Prior Publication Data

US 2024/0399440 A1 Dec. 5, 2024

(30) Foreign Application Priority Data

Jun. 2, 2023 (FR) ...................................... 2305571

(51) Int. Cl.

| | |
|---|---|
| *B21D 53/06* | (2006.01) |
| *B21C 37/15* | (2006.01) |
| *B21D 26/051* | (2011.01) |
| *B23K 1/00* | (2006.01) |
| *B23K 101/14* | (2006.01) |
| *B23P 15/26* | (2006.01) |
| *B32B 1/08* | (2006.01) |
| *B32B 15/01* | (2006.01) |
| *F28F 1/00* | (2006.01) |
| *F28F 21/08* | (2006.01) |

(52) U.S. Cl.
CPC ............ *B21D 53/06* (2013.01); *B21C 37/154* (2013.01); *B21D 26/051* (2013.01); *B23P 15/26* (2013.01); *B32B 1/08* (2013.01); *F28F 21/089* (2013.01); *B23K 1/0012* (2013.01); *B23K 2101/14* (2018.08); *B32B 15/011* (2013.01); *F28F 1/003* (2013.01); *F28F 2250/00* (2013.01); *F28F 2275/04* (2013.01); *F28F 2275/061* (2013.01)

(58) Field of Classification Search
CPC ...... B21D 53/06; B21D 26/051; B21D 39/04; B23K 1/0012; B23K 2101/14; B23K 31/027; B23K 2101/06; F28F 1/00–003; F28F 21/089; F28F 2255/00; F28F 2275/04–045; F28F 2275/061; B23P 15/26; B23P 2700/12; B21C 37/154; B32B 1/08; B32B 15/011

See application file for complete search history.

(56) References Cited

U.S. PATENT DOCUMENTS

| | | | | |
|---|---|---|---|---|
| 3,598,156 | A | * 8/1971 | Ulmer | ..................... F16L 58/08 138/143 |
| 3,863,328 | A | * 2/1975 | Arntz | .................... B21C 37/154 29/523 |
| 4,694,864 | A | 9/1987 | Libin | |
| 2011/0220237 | A1* | 9/2011 | Okamoto | ............... B21D 39/04 138/140 |
| 2011/0290364 | A1* | 12/2011 | Biris | ....................... B21C 23/24 138/140 |
| 2020/0200296 | A1* | 6/2020 | Moon | ..................... F16L 9/006 |

FOREIGN PATENT DOCUMENTS

| | | |
|---|---|---|
| CN | 101745793 A | 6/2010 |
| CN | 203928838 U | 11/2014 |
| CN | 104235515 B | 8/2016 |
| CN | 113458737 B | 4/2023 |
| EP | 0 167 418 B1 | 9/1987 |
| EP | 0 695 598 B1 | 11/1997 |
| EP | 1 537 921 B1 | 6/2007 |
| JP | 62-38783 A | 2/1987 |
| JP | 2-187280 A | 7/1990 |
| JP | 6-77855 B2 | 10/1994 |

OTHER PUBLICATIONS

Preliminary French Search Report issued Dec. 15, 2023 in French Application 2305571 filed on Jun. 2, 2023, 9 pages (with English Translation of Categories of Cited Documents & Written Opinion).

\* cited by examiner

*Primary Examiner* — Matthew P Travers
(74) *Attorney, Agent, or Firm* — Oblon, McClelland, Maier & Neustadt, L.L.P.

(57) ABSTRACT

A method for manufacturing a double-wall heat-exchanger tube including an external tube and an internal tube, these tubes being metallic, cylindrical and coaxial. This method includes providing a first tube having an inside diameter $d_{1int}$ and an outside diameter $d_{1ext}$, this first tube being intended to form the external tube, a second tube having an inside diameter $d_{2int}$ and an outside diameter $d_{2ext}$, this second tube being intended to form the internal tube, and a cylindrical coaxial tubular leaf made from $Fe^0$ having an inside diameter $d_{int}$ and an outside diameter $d_{ext}$, such that $0.15\text{ mm} \leq (d1int-dext) \leq 0.25\text{ mm}$, $0.15\text{ mm} \leq (dint-d2ext) \leq 0.25\text{ mm}$, and $10\text{ μm} \leq (dext-dint) \leq 200\text{ μm}$.

20 Claims, No Drawings

METHOD FOR MANUFACTURING A DOUBLE-WALL HEAT-EXCHANGER TUBE

TECHNICAL FIELD OF THE INVENTION

The present invention relates to a method for manufacturing a double-wall heat-exchanger tube, this double-wall tube being in particular intended to equip devices of the heat exchanger type.

Such heat exchangers find in particular an application in the chemical industry or in the energy field.

PRIOR ART

Heat exchangers are devices for transferring thermal energy from a first fluid to a second fluid, without mixing them.

Various types of dual-fluid heat exchanger exist including those that are equipped with a tube with a double wall, also known by the expression "double-wall tube", which comprises two cylindrical (tubular) coaxial tubes fitted one in the other, the internal surface of the smaller-diameter tube (the internal tube) being intended to come into contact with one of the fluids and the external surface of the larger-diameter tube (the external tube) being intended to come into contact with the other fluid.

The particular structure of a double-wall heat-exchanger tube has the advantage of increasing the safety of the heat exchanger that is equipped therewith, since each tube performs a dual function in a redundant manner: a fluid tightness function to prevent contact between the two fluids and a function to withstand the pressure exerted by the circulation of these two fluids.

This dual function is particularly important, for example, in the case where the heat exchanger equips plant, such as chemical reactors, in which heat exchange must be ensured, safely and effectively, between a first fluid such as reactive molten metals or metal salts, for example based on sodium, lithium or potassium, and a second fluid such as water. This is because any failure that might occur on a double-wall tube equipping such plant would have serious consequences for operation because of the chemical reactivity of the heat-transfer medium with the medium to be cooled. In this precise case, the strains in service, in addition to the static pressure of the fluids and to the corrosion of surfaces, result from stresses of thermal origin and fatigue strains imposed by the operating cycles or the vibrations caused by the thermohydraulics.

The majority of double-wall heat-exchanger tubes envisage leaving a mechanical clearance, or gap, between the internal and external tubes.

By connecting this gap to a detection system, it is thus possible to detect the presence of fluid coming from the piercing of one of the two tubes before the integrity of the other tube is impaired.

However, the presence of this gap is particularly detrimental with regard to the thermal conductivity properties of the double-wall heat-exchange tube and furthermore does not make it possible to effectively respond to a hypothetical simultaneous piercing of the two tubes forming it.

To improve the thermal conductivity of the double-wall exchanger tubes, it has been proposed that the gap between the two tubes be at least partially filled.

Document CN 203928838, referenced [1] in the present description, proposes a method for manufacturing a double-wall tube that comprises a step consisting of filling the gap between the internal and external tubes of such a double-wall heat-exchange tube with a metal powder. By providing a radial distribution of the temperature, this metal powder gives the double-wall tube good thermal conductivity and also reduces the risks of degradation associated with sudden thermal transitions and also makes it possible to attenuate the risks of degradation linked to sudden thermal transitions.

Document CN 113458737, referenced [2], proposes a method for manufacturing a double-wall tube comprising an external tube, an intermediate layer and an internal tube, the external and internal tubes as well as the intermediate layer being metallic, cylindrical and coaxial. The method described in document [2] comprises the following successive steps:

(1) the insertion of the internal tube coated with the intermediate layer into the external tube, the gap between the internal and external tubes being appropriate;

(2) the sealing and welding of the internal and external tubes at each of the ends thereof; and (3) the placing of the tubes thus welded for a hot isostatic pressing step under appropriate conditions for fusion welding.

In this document [2], the intermediate layer, which is made from a material selected from copper, nickel, chromium and vanadium, is produced by chemical or electrolytic deposition. In step (1), the appropriate gap between the internal and external tubes is between 0.2 mm and 2 mm.

Although they improve the thermal-conductivity properties of the double-wall tubes, the manufacturing methods described in documents [1] and [2] are relatively expensive and complicated to implement on an industrial scale.

The aim of the present invention is consequently to overcome the drawbacks of the methods of the prior art and to propose a method for manufacturing a double-wall heat-exchanger tube that has the dual function of fluid tightness and resistance to pressure, in particular by resisting the propagation of fatigue defects, as well as good thermal-conductivity properties, this method making it possible to achieve advantageous productivity and industrial-implementation costs compared with the methods described in documents [1] and [2].

DESCRIPTION OF THE INVENTION

The previously stated aims and others are achieved by a method for manufacturing a double-wall heat-exchanger tube of the aforementioned type, i.e. comprising an external tube and an internal tube, the external and internal tubes being metallic, cylindrical and coaxial.

According to the invention, the manufacturing method comprises the following successive steps (i) to (vii):

(i) the provision:

of a first tube having an inside diameter $d_{1int}$ and an outside diameter $d_{1ext}$, this first tube being intended to form the external tube, of a second tube having an inside diameter $d_{2int}$ and an outside diameter $d_{2ext}$, this second tube being intended to form the internal tube, and of a cylindrical coaxial tubular leaf made from $Fe^0$ having an inside diameter $d_{int}$ and an outside diameter $d_{ext}$, such that $$0.15 \text{ mm} \leq (d_{1int} - d_{ext}) \leq 0.25 \text{ mm},$$

$$0.15 \text{ mm} \leq (d_{int} - d_{2ext}) \leq 0.25 \text{ mm, and}$$

$$10 \text{ μm} \leq (d_{ext} - d_{int}) \leq 200 \text{ μm};$$

(ii) the coaxial assembly of the second tube and of the leaf inside the first tube, the leaf being positioned between the first and second tubes;
(iii) the brazing or the bonding of one end of the assembly obtained at the end of step (ii);
(iv) the co-deformation of the assembly obtained at the end of step (iii):
(v) the cutting of the ends of the co-deformed assembly obtained at the end of step (iv);
(vi) the welding of the cut ends of the assembly obtained at the end of step (v); and
(vii) the heat treatment of the assembly obtained at the end of step (vi), this heat treatment being implemented by hot isostatic pressing, by means of which the double-wall heat-exchanger tube is obtained.

The method according to the invention makes it possible to form, between the external and internal tubes, a dense metallic interphase made from pure iron that fills the entire initial volume of the gap existing between the first and second tubes and thus makes it possible to ensure a uniform mechanical junction between the external and internal tubes. The absence of mechanical clearance between the external and internal tubes makes it possible to avoid the movement of these two tubes with respect to each other: as these two tubes in some way now form only a single tube, they then deform in the same manner as a monolithic tube during mechanical stressing. Thanks to the manufacturing method according to the invention, we obtain a double-wall heat-exchanger tube having a particularly effective geometric quality.

This pure iron metal interphase also makes it possible to give the double-wall heat-exchanger tube excellent thermal-conductivity properties by ensuring very good heat transfer between the external and internal tubes, which has the effect of increasing the efficiency of a heat exchanger equipped with such a double-wall heat exchanger. Unexpectedly and surprisingly, the Inventor found that this ductile dense interphase made from iron $Fe^0$ provides excellent thermal conductivity that tends to a value close to that of an equivalent solid wall.

This ductility of the metal iron interphase also makes it possible to deflect and/or to stop the propagation of any fatigue cracks, in particular of fatigue cracks after a large number of cycles, which might be formed and propagated within one of the two tubes, thus preserving the integrity of the other tube. In particular, when the fatigue cracks are deflected, they propagate in the ductile metal interphase, thus offering a service life prolonged by 30% at ambient temperature.

This iron interphase is furthermore characterised by fluid tightness enabling it to avoid the capillary propagation of fluid coming from such a crack between the two tubes and therefore to drastically reduce the risks of contact between the first and second fluids of the heat exchanger, which is fundamental, in particular when the first and second fluids are reactive, when there is a risk of contamination or when the tubes cannot be inspected in service.

In addition, the method according to the invention does not implement any step of exposing the elements constituting the double-wall tube to hydrogen, unlike the electrolytic deposition that is used in the method of document [2], and which, when the exposure to hydrogen is not controlled, can weaken the metal material forming the elements constituting the tube, in particular when this material is steel.

The method according to the invention makes it possible to manufacture a double-wall heat-exchanger tube that has an inside diameter $d_{INT}$ and an outside diameter $d_{EXT}$.

According to one embodiment, the inside diameter $d_{INT}$ of the double-wall tube is between 6 mm and 30 mm, and advantageously between 8 mm and 15 mm.

According to one embodiment, the outside diameter $d_{EXT}$ of the double-wall tube is between 6 mm and 30 mm and advantageously between 10 mm and 20 mm.

The expression "between . . . and . . . " that is used above and also in the remainder of the present description to define an interval must be understood as defining not only the values of the interval but also the values of the bounds of this interval.

The method according to the invention comprises the steps (i) to (vii) mentioned above and detailed hereinafter.

In step (i) of the manufacturing method according to the invention, two tubes are provided, a first tube that is intended to form the external tube of the double-wall heat-exchanger tube, and a second tube that is intended to form the internal tube of this double-wall heat-exchanger tube.

The first tube has an inside diameter $d_{1int}$ and an outside diameter $d_{1ext}$, and the second tube has an inside diameter $d_{2int}$ and an outside diameter $d_{2ext}$.

A cylindrical coaxial tubular leaf is also provided, this leaf being formed from iron with an oxidation state of 0, i.e. pure iron $Fe^0$. This leaf made from $Fe^0$ has an inside diameter $d_{int}$ and an outside diameter dext.

The first and second tubes and the leaf are such that:

$$0.15 \text{ mm} \leq (d_{1int} - d_{ext}) \leq 0.25 \text{ mm},$$
$$0.15 \text{ mm} \leq (d_{int} - d_{2ext}) \leq 0.25 \text{ mm, and}$$
$$10 \ \mu\text{m} \leq (d_{ext} - d_{int}) \leq 200 \ \mu\text{m};$$

In other words, the leaf has a thickness of between 80 μm and 200 μm.

In one advantageous embodiment, the leaf has a thickness of between 80 μm and 150 μm.

In an advantageous variant of the method according to the invention, at least one of the elements selected from the first tube, the second tube and the tubular leaf is devoid of welding.

In a preferred variant of the method according to the invention, the first tube, the second tube and the tubular leaf are all devoid of welding. In doing so, the reliability in terms of fluid tightness and safety is maximised.

The first and second tubes, whether or not they are devoid of welding, can be produced by any conventional industrial method.

According to one advantageous embodiment, the first and second tubes are obtained by implementing, prior to step (i), the following successive steps ($i_0$) and ($i_1$):
($i_0$) the hot spinning or the hot rolling of a pierced rod (also referred to as a billet), by means of which a tubular blank is obtained, and
($i_1$) the cold drawing or the pilger rolling of the tubular blank as obtained at the end of step ($i_0$).

Implementing these steps ($i_0$) and ($i_1$) makes it possible to obtain weld-free tubes that can achieve lengths of up to 6 m.

According to one advantageous embodiment, the weld-free tubular leaf is obtained by implementing, prior to step (i), the following successive steps ($i_2$) to ($i_4$):
($i_2$) the drilling of a rod made from iron $Fe^0$,
($i_3$) the turning of the pierced rod as obtained at the end of step ($i_2$), by means of which a tubular blank is obtained, and ($i_4$) the pilger rolling of the tubular blank as obtained at the end of step ($i_3$).

In a variant, which will be illustrated in the example described below, the pilger rolling step ($i_4$) can be reproduced at least once. The method according to the invention can further comprise a step ($i_4$') of heat treatment preferably conducted between each step ($i_4$) and, for example, at 850° C. for 1 hour.

According to one advantageous embodiment, the method according to the invention further comprises a step of cleaning at least the internal surface of the first tube, the internal and external surfaces of the tubular leaf and the external surface of the second tube, this cleaning step being implemented prior to the coaxial assembly step (ii).

This cleaning step optimises the subsequent contact between the tubular leaf and the surfaces of the external and internal tubes with which this leaf will be in contact and, in doing so, improves the fluid tightness and thermal conductivity of the double-wall heat-exchanger tube.

The manufacturing method according to the invention comprises, after step (i), a step (ii) of coaxial assembly of the first and second tubes and of the tubular leaf made from iron $Fe^0$. More particularly, in this step (ii), the second tube and the leaf are introduced inside the first tube, the leaf being disposed between the first and second tubes.

In other words, at the end of step (ii), an assembly, in which the tubular leaf made from iron $Fe^0$ is positioned between the first and second tubes, is obtained.

The manufacturing method according to the invention comprises, after the coaxial assembly step (ii), a step (iii) of brazing or of bonding one end of the assembly obtained at the end of step (ii).

This brazing step (iii) makes it possible to maintain the assembly for implementing the subsequent steps of the method according to the invention, in particular the co-deformation step (iv) thereof, but also to protect the tubular leaf from any contamination, in particular that caused by the lubricants that are used during this subsequent co-deformation step (iv).

The braze must advantageously have sufficient ductility to be able to be co-deformed with the tubes and tubular leaf during step (iv).

In a particular embodiment involving first and second stainless-steel tubes, the brazing step (iii) is implemented with a braze having a high silver content.

The manufacturing method according to the invention comprises, after the brazing step (iii), a step (iv) of co-deformation of the assembly obtained at the end of step (iii).

This co-deformation step (iv) makes it possible to reduce the volume of the mechanical clearance existing between the first tube and the leaf, on the one hand, and between the second tube and the leaf, on the other hand, which favours the uniform elongation of the tubes and of the leaf as well as the preservation of the geometry of the assembly of these elements during the subsequent operations, while guaranteeing the absence of folding of the leaf during deformation.

This co-deformation step (iv) can in particular be implemented by co-drawing or by co-rolling.

In an advantageous variant of the method according to the invention, this co-deformation step (iv) is implemented by pilger co-rolling of the assembly obtained at the end of step (iii).

Selecting such a pilger co-rolling step (iv) has the advantage of reducing the volume of the mechanical clearance between the first and second tubes and the tubular leaf. In doing so, the quantity of gas contained in the assembly becomes negligible and no degassing step is necessary before implementing the subsequent steps, in particular the welding step (vi).

In one embodiment, the manufacturing method according to the invention does not comprise a degassing step between the co-deformation step (iv) and the welding step (vi).

The elimination of such a degassing step, which is particularly complex to implement on an industrial level in the context of the manufacture of double-wall tubes, contributes to a significant reduction in the cycle times and in the production costs and times.

The manufacturing method according to the invention comprises, at the end of the co-deformation step (iv), a step (v) of cutting the ends of the co-deformed assembly, so as to eliminate the ends of the assembly affected, in the case of one, by the brazing and, in the case of the other, by the percolation of lubrication fluids.

These ends cut at step (v) are then subjected to a welding step (vi).

This step (vi) of welding the two ends of the assembly makes it possible to isolate from the environment the interfaces of the tubular leaf with the first and second tubes.

In one embodiment, the welding step (vi) is implemented by an arc-welding method with a non-meltable electrode, for example made from tungsten, and without addition of material. This welding can advantageously be implemented under neutral gas.

The manufacturing method according to the invention comprises, after the welding step (vi), a step (vii) of heat treatment of the assembly obtained at the end of step (vi).

This step (vii) of heat treatment of the assembly obtained at the end of step (vi) is implemented by hot isostatic pressing (HIP), by means of which the double-wall heat-exchanger tube is obtained.

This step (vii) of hot isostatic pressing makes it possible to weld, by diffusion, the internal surface of the first tube to the external surface of the tubular leaf, on the one hand, and the external surface of the second tube to the internal surface of the tubular leaf, on the other hand. At the end of the hot isostatic pressing step (vii), a uniform mechanical junction between the first and second tubes is obtained, said junction being formed by an interphase of pure iron coming from the tubular leaf. The presence of a small quantity of oxygen trapped in the roughnesses of the leaf and tubes interfaces (absence of degassing) contributes to the formation of mixed iron and chromium oxides (in the case of steel tubes), which play a role in promoting surface delamination during fatigue crack propagation.

This hot isostatic pressing step (vii), which causes little or no deformation of the first and second tubes and of the tubular leaf, makes it possible to optimise the preservation of the geometry of the assembly formed by these tubes and leaf and, consequently, to respect the geometric tolerances of the finished tubes, which ensures reproducibility and therefore reliability of the double-wall heat-exchanger tubes manufactured by the method according to the invention.

In a particular embodiment, step (vii) is implemented at a temperature of between 800° C. and 1200° C., at a pressure of between 50 MPa and 200 MPa and for a period of between 30 minutes and 4 hours.

In one advantageous embodiment, step (vii) is implemented at a temperature of between 1000° C. and 1200° C., at a pressure of between 100 MPa and 200 MPa and for a period of between 30 minutes and 2 hours.

The method according to the invention makes it possible to manufacture double-wall heat-exchanger tubes with variable lengths and geometries.

The materials of the first tube and of the second tube may be identical or different, and may in particular comprise iron.

In one advantageous variant, the first and second tubes are produced from a material comprising iron, in particular from stainless steel. This stainless steel can advantageously be a martensitic steel, advantageously Eurofer-97 or T-91 steel.

In a preferred variant, the materials of the first and second tubes are identical.

In one embodiment, the manufacturing method according to the invention further comprises, after the heat treatment step (vii), one or more of the following steps (viii) to (xii):
 (viii) cooling of the double-wall heat-exchanger tube, for example at a rate of 50° C./hour;
 (ix) curving of the double-wall heat-exchanger tube obtained at the end of step (viii);
 (x) expansion of the double-wall heat-exchanger tube obtained at the end of step (viii) or (ix);
 (xi) heat treatment of the double-wall heat-exchanger tube obtained at the end of step (ix) or (x), such as quenching or normalised ageing; and
 (xii) straightening of the double-wall heat-exchanger tube obtained at the end of step (ix), (x) or (xi).

In particular, and especially when the first and second tubes are made from stainless steel and more particularly from Eurofer-97, a cooling step (viii) makes it possible to maintain the double-wall tube in a state suitable for curving and/or expansion of the tube.

The double-wall tubes manufactured by the method according to the invention can be curved or assembled as conventional tubes.

It should be noted that selecting pure iron for the tubular leaf and therefore for the interphase of the double-wall tube does not alter the composition of the weld puddle when such tubes are assembled by welding. It can therefore be envisaged assembling the tubes in full thickness without significantly modifying the composition of the weld bead due to the presence of the iron interphase.

It would be entirely different with an interphase made from copper, chromium, nickel or vanadium as described in document [2], which requires a significant change in the composition of the weld bead, with the possible risk of modifying the mechanical properties of the weld bead of such a tube.

The method according to the invention therefore greatly favours the industrial manufacture of double-wall heat-exchanger tubes by eliminating the need for interphase-free zones, also known as reserves, located in the area of future welds.

In general terms, the purpose of the heat treatment step (xi) is to confer the mechanical properties expected for the double-wall tube manufactured by the method according to the invention.

This heat treatment (xi) can, for example, be selected from quenching, normalised ageing and annealing, or even be a combination of these (quenching followed by normalised ageing), this treatment being adapted to the specifications of the material or materials forming the first and second tubes.

Moreover, due to the change of phase(s) that may occur during the heat treatment step (xi), a geometric distortion of the double-wall heat-exchanger tube is possible. A straightening step (xii) can then be envisaged for ensuring the geometric conformity of this double-wall heat-exchanger tube.

Other features and advantages of the invention will emerge from the reading of the following example that relates to the manufacture of a double-wall heat-exchanger tube.

This example is given only by way of illustration of the object of the invention and under no circumstances constitutes a limitation of this object.

DETAILED DESCRIPTION OF A PARTICULAR EMBODIMENT

A double-wall heat-exchanger tube was manufactured by the method according to the invention.

Production of the Tubes and Leaf

The first and second tubes intended to form respectively the external tube and the internal tube of the double-wall heat-exchanger tube were produced from Eurofer-97 stainless steel, the composition of which (in mass percentage) is stated in Table 1 below.

TABLE 1

| V | Cr | Mn | Ta | W | C | N | Fe |
|---|---|---|---|---|---|---|---|
| 0.2 | 9 | 0.4 | 0.075 | 1.1 | 0.11 | 0.03 | the remainder |

Table 1

These first and second tubes are weld-free cylindrical tubes that were produced by a conventional industrial method from a blank made from Eurofer-97 steel that was drawn so as to obtain tubes with a length of 2.5 m and:
 for the first tube, a thickness of 1.45 mm and respective outside and inside diameters of 14.00 mm ($d_{1ext}$) and 11.12 mm ($d_{1int}$), and
 for the second tube, a thickness of 1.20 mm and respective outside and inside diameters of 10.62 mm ($d_{2ext}$) and 8.2 mm ($d_{2int}$).

The cylindrical tubular leaf made from pure iron was prepared from a pure iron marketed by the company Liffs under the name ARMCO® Pure Iron grade 4.

Tubular blanks 500 mm long and with respective outside and inside diameters of 16.22 mm and 12.57 mm were first machined by drilling and then by turning before being rolled.

The tubular blanks were next subjected to a first pilger rolling followed by a first is heat treatment at 850° C. for 1 hour, and then to a second pilger rolling followed by a second heat treatment at 850° C. for 1 hour, and then to a third pilger rolling followed by a third heat treatment at 850° C. for 1 hour, and finally to a fourth and last pilger rolling.

At the end of these rolling steps interspersed with heat treatment steps, the weld-free tubular leaf having a thickness of 100 μm and respective outside and inside diameters of 10.97 mm ($d_{ext}$) and 10.77 mm ($d_{int}$) was obtained.

Preparation of the Surfaces

The internal surface of the first tube intended to form the external tube was cleaned by means of sand blasting with corundum so as not to affect the inside diameter $d_{1int}$ by more than 50 μm.

The external surface of the second tube intended to form the internal tube was cleaned by means of an abrasive brush of the Scotch-Brite™ type so as not to affect the outside diameter $d_{2ext}$ by more than 50 µm.

The internal and external surfaces of the first and second tubes and the internal and external surfaces of the tubular leaf made from pure iron were carefully cleaned with a rag and then with acetone.

Assembly of the Tubes and Leaf

The second tube and the tubular leaf were then assembled coaxially inside the first tube, the tubular leaf being positioned between the first and second tubes.

Given the respective outside and inside diameters of the first and second tubes and of the tubular leaf as obtained after the preparation of the various surfaces, a technical clearance of at least 150 µm exists between the leaf and the first tube, on the one hand, and between the leaf and the second tube, on the other hand, which obviously facilitates the assembly of these three elements.

Brazing of the Assembly

The second internal tube was positioned so as to project beyond the first tube by several centimetres. The first and second tubes were then heated by oxyacetylene torch before proceeding with the deposition of a silver braze between the two tubes. Silver braze has a content that is compatible with the steel of the first and second tubes, which comprises 9% by mass of chromium. The braze percolates in the assembly clearance between the tubes over the extent of the zone heated by the torch. It should be noted that this braze is characterised by sufficient ductility to be co-deformed with the tubes and the leaf during the subsequent co-deformation step.

Cooling in stages was next implemented to avoid the formation of a fragile martensitic structure.

Co-Deformation of the Assembly

The assembly was next subjected to pilger rolling.

Table 2 below reports the outside and inside diameters (denoted $d_{outside}$ and $d_{inside}$ and expressed in mm) of the first and second tubes and of the tubular leaf before and after this step of co-deformation by pilger rolling of the assembly.

TABLE 2

|  | Before co-deformation | | After co-deformation | |
| --- | --- | --- | --- | --- |
|  | $d_{outside}$ | $d_{inside}$ | $d_{outside}$ | $d_{inside}$ |
| First tube | 14.00 | 11.12 | 13.50 | 10.60 |
| Leaf | 10.97 | 10.77 | 10.60 | 10.40 |
| Second tube | 10.62 | 8.20 | 10.40 | 8.00 |

Cutting and Welding

The ends of the assembly as obtained at the end of the co-deformation step were cut to eliminate the end thermally affected by the brazing as well as the opposite end possibly affected by the percolation of the lubrication fluid.

The assembly was next cut into sections having a length compatible with the chamber in which the hot isostatic pressing (HIP) step was next implemented.

The sections were then welded by a tungsten-electrode welding method without addition of material and under neutral gas. This welding step is implemented without prior degassing, the technical clearance between the tubes and the leaf being very small after the co-deformation step.

Heat Treatment by Hot Isostatic Pressing (HIP)

The sections were then placed in a chamber in order to undergo therein a hot isostatic pressing cycle conducted at a temperature of 1100° C., at a pressure of 1200 bar (120 MPa), for 1 hour.

Supplementary Treatments

After the HIP step, the double-wall tube sections as obtained were cooled at a rate of 50° C./h, conferring a ferritic metallurgical state (no martensite) enabling them to be curved like conventional tubes.

These tubes thus formed and welded were next heat treated by quenching and ageing.

The double-wall tube sections thus manufactured by the method according to the invention had an outside diameter of 13.50 mm (±0.25 mm) and a thickness of 2.75 mm (±0.35 mm).

The double-wall tube thus manufactured makes it possible to contain pressurised water at a mean temperature of 325° C., it being stated that each of the first and second tubes can, by itself alone, withstand the forces related to the pressure of the water.

BIBLIOGRAPHY

[1] CN 203928838
[2] CN 113458737

The invention claimed is:

1. A method for manufacturing a double-wall heat-exchanger tube comprising an external tube and an internal tube, the external and internal tubes being metallic, cylindrical and coaxial, said manufacturing method comprises the following successive steps (i) to (vii):
(i) providing:
a first tube having an inside diameter $d_{1int}$ and an outside diameter $d_{1ext}$, said first tube being intended to form the external tube,
a second tube having an inside diameter $d_{2int}$ and an outside diameter $d_{2ext}$, said second tube being intended to form the internal tube, and
a cylindrical tubular leaf made from $Fe^0$ having an inside diameter $d_{int}$ and an outside diameter $d_{ext}$, such that $$0.15 \text{ mm} \leq (d_{1int} - d_{ext}) \leq 0.25 \text{ mm},$$

$$0.15 \text{ mm} \leq (d_{int} - d_{2ext}) \leq 0.25 \text{ mm, and}$$

$$10 \text{ µm} \leq (d_{ext} - d_{int}) \leq 200 \text{ µm};$$

(ii) forming a coaxial assembly of the second tube and of the leaf inside the first tube, the leaf being positioned between the first and second tubes;
(iii) brazing or bonding of one end of the coaxial obtained at the end of step (ii);
(iv) generating a co-deformation of the coaxial co-deformed assembly obtained at the end of step (iii) to obtain a co-deformed assembly:
(v) cutting ends of the co-deformed assembly obtained at the end of step (iv);
(vi) welding the cut ends of the co-deformed assembly obtained at the end of step (v); and
(vii) performing a heat treatment of the assembly obtained at the end of step (vi), said heat treatment being implemented by hot isostatic pressing, with which the double-wall heat-exchanger tube is obtained.

2. The method according to claim 1, wherein the first and second tubes provided at step (i) are devoid of welding.

3. The method according to claim 2, wherein each of these first and second tubes have been obtained by implementing, prior to step (i), the following successive steps ($i_0$) and ($i_1$):
($i_0$) hot spinning or hot rolling of a pierced rod, with which a tubular blank is obtained, and ($i_1$) cold drawing or pilger rolling of the tubular blank as obtained at the end of step ($i_0$).

4. The method according to claim 1, wherein the tubular leaf provided at step (i) is devoid of welding.

5. The method according to claim 4, wherein step ($i_4$) of pilger rolling is reproduced at least once.

6. The method according to claim 5, the method further comprises a heat treatment step ($i_4'$).

7. The method according to claim 6, wherein heat treatment step ($i_4'$) is conducted between each step ($i_4$).

8. The method according to claim 6, wherein heat treatment step ($i_4'$) is conducted at 850° C. for 1 hour.

9. The method according to claim 4, wherein the tubular leaf provided at step (i) is obtained by implementing, prior to step (i), the following successive steps ($i_2$) to ($i_4$):

($i_2$) drilling of a rod made from iron $Fe^0$,
($i_3$) turning of the drilled rod as obtained at the end of step ($i_2$), with which a tubular blank is obtained, and
($i_4$) pilger rolling of the tubular blank as obtained at the end of step ($i_3$).

10. The method according to claim 1, further comprising a step of cleaning at least drilled of the first tube, pilger of the tubular leaf and an external surface of the second tube, said cleaning step being implemented prior to the coaxial assembly step (ii).

11. The method according to claim 1, wherein the co-deformation step (iv) is implemented by co-drawing or by co-rolling, and by pilger co-rolling, of the coaxial assembly obtained at the end of step (iii).

12. The method according to claim 1, which does not comprise a degassing step between the co-deformation step (iv) and the welding step (vi).

13. The method according to claim 1, wherein the welding step (vi) is implemented by an arc welding method with a non-meltable a electrode, and without addition of material.

14. The method according to claim 13, wherein the non-meltable electrode is made from tungsten.

15. The method according to claim 1, wherein step (vii) is implemented at a temperature of between 800° C. and 1200° C., at a pressure of between 50 MPa and 200 MPa and for a period of between 30 minutes and 4 hours.

16. The method according to claim 1, further comprising, after step (vii), one or more of the following steps (viii) to (xii):

a (viii) cooling of the double-wall heat-exchanger tube;
(ix) curving of the double-wall heat-exchanger tube obtained at the end of step (viii);
(x) expanding the double-wall heat-exchanger tube obtained at the end of step (viii) or (ix);
(xi) heat treating the double-wall heat-exchanger tube obtained at the end of step (ix) or (x); and
(xii) straightening of the double-wall heat-exchanger tube obtained at the end of step (ix), (x) or (xi).

17. The method according to claim 16, wherein cooling step (viii) is carried out at a rate of 50° C./hour.

18. The method according to claim 16, wherein heat treating step (xi) is carried out by quenching or normalised ageing.

19. The method according to claim 1, wherein the first and second tubes are made from martensitic stainless steel, from Eurofer-97 or from T-91 steel.

20. The method according to claim 1, wherein the materials of the first and second tubes are identical.

* * * * *